United States Patent

[11] 3,620,919

| [72] | Inventor | Roland Hardman |
| | | Bradford-on-Avon, England |
| [21] | Appl. No. | 751,760 |
| [22] | Filed | Aug. 12, 1968 |
| [45] | Patented | Nov. 16, 1971 |
| [73] | Assignee | National Research Development Corporation |
| | | London, England |
| [32] | Priority | Aug. 30, 1967 |
| [33] | | Great Britain |
| [31] | | 39,765/67 |

[54] EXTRACTION OF STEROIDAL MATERIALS FROM VEGETABLE MATERIALS
23 Claims, No Drawings

[52] U.S. Cl.................................................. 195/7, 195/32, 260/210.5
[51] Int. Cl...................................................... C12b 1/00
[50] Field of Search............................................ 195/1, 2, 52, 7, 28, 29, 30, 32; 260/210.5, 239.55

[56] References Cited
UNITED STATES PATENTS

| 3,163,636 | 12/1964 | Wagner et al.................. | 260/210.5 |
| 3,169,959 | 2/1965 | Printy et al. .................. | 260/210.5 |
| 2,774,714 | 12/1956 | Hershberg...................... | 195/32 |

Primary Examiner—A. Louis Monacell
Assistant Examiner—Gary M. Nath
Attorney—Jacobs & Jacobs ABSTRACT: The yield of recoverable steroidal saponins and sapogenins from steroidal sapogenin affording vegetable materials is increased by treating the vegetable material with a regulator prior to recovery of the steroidal material. The regulator is a substance capable of modifying normal plant metabolism or normal plant growth characteristics and the chemically diverse regulators are selected from naturally occurring and synthetic plant growth regulators including auxins, hormones and herbicides, sulphydryl inhibitors, regulators of steroid metabolism or lipid metabolism, naturally occurring and racemic $\alpha$-amino acids, vitamins of the B group, rutin and water-soluble derivatives of vitamin A and tocopherol, growth factor analogues including vitamin and amino acid antimetabolites and penicillin, griseofulvin and chloramphenicol antibiotics. Diosgenin is recovered from species of *Dioscorea*, *Trigonella* and *Balanites* by incubating the vegetable material with regulator in an aqueous medium for up to 72 hours, hydrolyzing the incubated product with hydrochloric acid and solvent extracting sapogenins from the hydrolysate. Yields are further increased by also adding steroid precursors or $C_{10}$ to $C_{36}$ saturated hydrocarbons during incubation.

EXTRACTION OF STEROIDAL MATERIALS FROM VEGETABLE MATERIALS

This invention relates to the extraction of steroidal sapogenins and sapogenins from vegetable materials.

Sapogenin-yielding vegetable materials are grown in many parts of the world, and the sapogenins which can be obtained from them are of considerable commercial significance as they can be used as starting materials for the manufacture of various biologically active steroid compounds, particularly corticosteroids. Commercially important sapogenins include diosgenin, hecogenin and the *Solanum* sapogenins which are steroidal alkaloids. Sapogenins normally occur in the vegetable material in the form of saponins in relatively small amounts, e.g. about 2 percent, and much study has been given to the problem of their efficient extraction. Various forms of pretreatment of the vegetable material have been devised with a view to increasing the amount of available sapogenin material or increasing extraction efficiency, for example by allowing the vegetable material to ferment prior to extraction or comminuting the material to break down the cell walls as much as possible.

It has now been found that the total amount of sapogenin recovered can be increased if those portions of the vegetable material from which the sapogenin is to be recovered are treated, prior to sapogenin recovery, with certain substances having biological activity in relation to plant metabolism. The exact mode of action of these substances in the present process is uncertain at the moment, but they are believed perhaps to promote the biosynthesis of the sapogenin-affording materials, possibly by promoting enzyme activity, or perhaps to inhibit the activity of enzymes which degrade the sapogenin-affording material.

In a process for recovering steroidal saponins and sapogenins from steroidal sapogenin-affording vegetable materials, the present invention comprises the step of treating the vegetable material, prior to the recovery of the saponin or sapogenin, with a regulator which is capable of modifying normal plant metabolism or normal plant growth characteristics, and which enables an increased yield of steroidal saponin or sapogenin to be recovered compared to an otherwise identical recovery procedure from which treatment with regulator is omitted.

It has not yet been found possible to correlate this desirable regulator activity with any particular chemical structure, although the known biological activities of the regulators, which are usually organic compounds, fall into a relatively small number of distinct recognized biological activities. These are:

a. naturally occuring plant growth regulators including auxins and hormones b. synthetic plant growth regulators, including auxins, hormones and herbicides c. sulfhydryl inhibitors d. regulators of lipid metabolism e. regulators of steroid metabolism f. naturally occuring and racemic α-amino acids g. vitamins of the B group, rutin and water-soluble derivatives of vitamin A and tocopherol h. growth factor analogues including vitamin and amino acid antimetabolites i. antibiotics of the penicillin, griseofulvin and chloramphenicol classes.

Regulators used in the process of this invention may exhibit more than one of the activities mentioned above and hence can be classified in more than one of the classes (a) to (i). Mixtures of materials may also be used, each component exhibiting one or more of the activities mentioned above. These mixtures will be discussed in more detail below.

There is, of course, still considerable diversity within these classes of biological activity. This is believed to result from the large number of possible modes of action by which the regulators can produce the overall effect of increasing the recoverable amount of saponin or sapogenin. A multienzyme system operates within the sapogenin-affording plant materials, and while the regulator presented to the vegetable material may act directly by promoting saponin biosynthesis or by inhibiting saponin biodegradation, the beneficial effect of the regulator may result from a more indirect effect. For example, the regulator presented to the plant material may not itself be an enzyme regulator but is converted to such an active material either chemically or physically under the influence of endogenous enzymes or a further regulator. An indirect effect could also result from the regulator presented to the vegetable material acting not on the sapogenin-affording materials formation or release mechanism, but rather on certain cellular processes which have at their end result an increase in the sapogenin yield.

Specific regulators which have been found to produce an overall increase in the yield of sapogenin recovered in experimental systems will now be described and discussed, but it should be appreciated that these chemically diverse materials only represent readily available examples selected from the nine classes (a) to (i) described above and should not be regarded as indicating that the beneficial effect on sapogenin yield can only be achieved using these particular chemically defined materials.

These specific regulators include the following:

a. Naturally occurring plant growth regulators: 3-indoleacetic acid, the gibberellins, kinetin (6-furfurylamino purine) traumatic acid, abscissic acid.

b. Synthetic plant growth regulators: derivatives of acetic, propionic, butyric, maleic, acrylic, benzoic and picolinic acids, e.g. 2:4-dichlorophenoxyacetic acid and other chlorinated phenoxy alkanoic acids, together with their salts, esters and amides, trichloroacetic acid, 4-amino-3,5,6-trichloropicolinic acid (picloram); derivatives of naphthalene, e.g. methyl-1-naphthalene acetate; bipyridylium herbicides, e.g. 1,1'-ethylene-2,2'-bipyridylium dibromide (diquat) and 1,1'-dimethyl-4,4'-bipyridylium dichloride (paraquat); carbamates, e.g. isopropyl N-(3-chlorophenyl) carbamate (chloropham); amides, e.g. 2-chloro-NN-diallyl-acetamide (CDAA); ureas, e.g. N'-(4-chlorophenyl)-NN-dimethylurea (monuron); diazines, e.g. 1,2,3,6-tetrahydro-3,6-dioxopyridazine (MH); triazines; e.g. 2-chloro-4-ethylamino-6-isopropylamino-1,3,5-triazine (atrazine); phenols, e.g. 2-(1-methylpropyl)-4,6-dinitrophenol (dinoseb); substituted uracils, e.g. 5-bromo-3-sec-butyl-6-methyluracil (Bromacil); and miscellaneous herbicides such as ethylene glycol bis-trichloroacetate; 2,3,6-trichlorobenzyloxy propanol; 2,6-dichlorobenzonitrile (dichlorobenil); 3-amino-1,2,4-traizole (amitrole); 2,6-dichloro-thiobenzamide (chlorthiamid); disulfides such as di-(ethoxy thiocarbonyl) disulfide (herbisan); and organo arsenicals, e.g. disodium methane arsonate (D-SMA); N-6-benzyl adenine;

c. Sulfhydryl inhibitors: derivatives of lactic and maleic acids and indole, e.g. N-ethyl malemide, N-phenyl malemide, DL-3-indole lactic acid, 5-hydroxy indole, 3-methyl indole; iodoacetic and iodosobenzoic acids and iodoacetamide.

d. Regulators of lipid metabolism: the enzyme preparation vasolastine (Enzypharm C.V.), e. Regulators of steroid metabolism: ethyl-α-(4-chlorophenoxy)-α-methylpropionate (atromid-S); 2-(p-chlorophenyl)-1-[p-[2-(diethylamino) ethoxy]phenyl]-1-p-tolyl ethanol (triparanol); lipostabil, a soya bean preparation.

f. Naturally occurring and racemic amino acids: L-valine, L-threonine, DL-iso-leucine, and L-leucine;

g. B group vitamins: choline chloride, pyridoxal hydrochloride, riboflavin, thiamine hydrochloride and vitamin growth factors including yeast preparations, cottonseed preparations, grain preparations such as distiller' solubles, and soya bean preparations. Such preparations usually contain amino acids also.

h. α-picolinic acid hydrochloride, DL-desthiobiotin, allyl-DL-glycine.

i. Antibiotics:

penicillin G—sodium salt, chloramphenicol griseofulvin.

Following the novel treatment step of the invention, the sapogenins may be recovered directly from the vegetable material by known methods, for example by subjecting the treated vegetable to the action of a substance capable of hydrolyzing glycosidic linkages, e.g. an aqueous acid, or water under pressure and then recovering the sapogenins from the hydrolysate product, e.g. by solvent extraction. Alternatively, the sapogenins may be recovered indirectly from the vegetable material by subjecting the treated vegetable material to extraction with a saponin solvent such as methanol, and then hydrolyzing the glycosidic linkages in the extract with acid to release the sapogenins, which may then be recovered from the hydrolysate product, e.g. by solvent extraction. When either of these recovery methods are used, the regulator treatment should be carried out before the hydrolysis step.

The process of the present invention is particularly concerned with the recovery of steroidal materials from the monocotyledonous plant materials, at present used for commercial sources of sapogenins, for example fruits, leaves, corms, rhizomes, tubers or roots in the families *Dioscoreaceae*, *Liliaceae* and *Amaryllidaceae*, and, more particularly, from various *Dioscorea* such as *D. sylvatica*, *D. composita*, *D. floribunda*, *D. mexicana*, *D. tokoro*, *D. deltoidea* and other genera such as *Tamus*, *Agave*, *Aletris*, *Asparagus*, *Similax*, *Trilium*, *Yucca*. The present process is also applicable to the recovery of sapogenins from dicotyledonous materials, for example those in the *Leguminosae*, *Solanaceae*, *Balanitaceae* and *Zygophyllaceae* families, and particularly seeds and fruits derived from the genera Trigonella, Trifolium, Solanum and Balanites, such as *Trigonella foenumgraecum*, *Trigonella coerulea*, *T. corniculata*, *T. cretica*, *Trifolium ornithopodiodes*, *Solanum laciniatum*, *S. khasianum*, *Balanites aegyptiaca* (*B. roxburghii*), *B. orbicularis*, *B. pedicellaris* and *B. wilsoniana*.

Pretreatment by incubation has already been proposed for certain sapogenin-affording vegetable materials by maintaining the vegetable material in the presence of an aqueous medium for a suitable period of time, often at an elevated temperature. If necessary, water is added to vegetable material in a quantity sufficient to provide a separate aqueous phase throughout the incubation period. Such pretreatment may advantageously be included in the process of the present invention and it has been found that if this incubation is carried out, e.g., for 1 to 30 days, in the presence of regulator, added at the beginning of or during the incubation period, the overall yield of sapogenins ultimately recovered can be increased. Part of the increased yield is almost certainly due to the incubation itself, but comparison with control experiments, carried out at the same point in time, shows that part of the increased yield is clearly attributable to the presence of the regulator. Even when the regulator is not introduced until immediately prior to recovery of the steroidal material, i.e., before the hydrolysis step, the amount of recoverable sapogenins is increased compared to control extractions where regulator is omitted. When this last-mentioned alternative is adopted, the vegetable material may first be incubated in the presence of an added aqueous medium, e.g., for 1-30 days, and then treated with regulator and subjected to hydrolysis or the incubation pretreatment step may be omitted altogether.

As mentioned above, it is believed that the regulator substances influence the course of the biosynthesis of the sapogenin-affording materials and result in an increased yield of steroidal material but they are probably not themselves actually taken up in the biosynthesis. For this reason, it is believed necessary only to introduce small quantities of the regulator substances, of the order of 1,000 parts per million (p.p.m.) based on the air-dry weight (that is, containing not more than 10 percent water by weight) of the vegetable material, and typical quantities are 50–100 p.p.m. regulator based on the air-dry weight of vegetable material.

The regulator may be added as a pure chemical substance or in the form of a commercial formulation containing the desired regulator as an active substance.

Tuber vegetable material to be subjected to pretreatment may be broken up to some extent to ensure that the liquids present have ready access to all portions of the material, and, in the case of tubers, for example, the tuber may be sliced thinly, comminuted so that some cells are broken, comminuted so that many cells are broken, or sliced, dried and then powdered. As an additional or alternative pretreatment, the vegetable material may be incubated with degrading enzymes such as cellulase or pectinase; this is believed to assist in bringing the regulator and later the hydrolyzing agent into contact with as many of the cells as possible. When enzyme pretreatment is adopted, enzyme pretreatment and the incubation mentioned above are best carried out simultaneously and the regulator may be introduced at any stage in the incubation period.

An incubation step is preferably carried out in conjunction with the process of the present invention, adding if necessary a sufficient quantity of water to the vegetable material so that there is a separate aqueous phase present at the end of the incubation. Additional water is usually necessary in the case of seeds and dried tuber and leaf materials. This mixture is maintained preferably at an elevated temperature, e.g. 25°–40° C. or even up to 80° C., and in the presence of added regulator as described above. It is found that the ultimate yield of sapogenins recovered is dependent on the time of this incubation stage and the temperature at which it is carried out and that, for example where one species is concerned, the yield after 1 day's incubation at 37° C. might be double the yield after 3 days' incubation. However, at a different period in time, the optimum incubation period for the same species at the same temperature might change from 1 day to 3 days. This is because the steroidal material is being recovered from a biological system in which the steroidal material is being continuously biosynthesized and biodegraded during the incubation. Some preliminary experimentation is therefore necessary to establish the optimum incubation period and temperature for the particular plant material concerned as this same fluctuation of yield with incubation time and temperature is found when incubation is carried out in the presence of regulator.

The recovery of sapogenins from the treated product may conveniently be carried out be treating the product with a mineral acid to hydrolyze the glycosidic linkages, for example an incubation product may be heated, e.g. up to reflux temperature, with 2N hydrochloric acid for up to about 5 hours when the sapogenins, which are acid-insoluble, are released. Other nonoxidizing mineral acids such as sulfuric acid may also be used in this hydrolysis step as may other acid materials such as acid salts. The acid-insoluble material may then be separated from the hydrolysate, e.g. by filtration or centrifugation, and the sapogenins recovered by extracting the acid-free acid-insoluble residue with a sapogenin solvent such as petroleum ether.

When one of the dicotyledonous materials, e.g. a seed, is to be pretreated, it is preferred to avoid comminution of the seed as described in more detail in our copending U.K. Pat. application No. 44939/65. It may be convenient, however, to break up large seeds, e.g. *Balanites*, into smaller pieces. Seeds such as *Balanites* containing significant quantities of oil are preferably partially defatted before the regulator is introduced.

The present process may be used in combination with the process described in copending U.K. Pat. application No. 36711/66. This earlier process relates to the pretreatment of the vegetable material with certain saturated hydrocarbons which are believed to participate in metabolism and can result in an increase in the total amount of recoverable saponin or sapogenin.

Specific saturated hydrocarbons which can be used with advantage in combination with the regulators are those containing 10–36 carbon atoms in the molecule, and particularly n-hexadecane, n-eicosane, n-pentacosane, n-hexacosane and n-octacosane. Branch chain hydrocarbons such as squalane (2,6,10,15,19-23-hexamethyl-tetracosane) may also be used.

A similar benefit can be obtained by using the regulators in conjunction with steroid precursors such as mevalonic acid or derivatives thereof, or squalene. It is believed that particularly high yields of sapogenin-affording material can be biosynthesized and recovered by introducing saturated hydrocarbon or steroid precursor during incubation of the vegetable material since this additive, perhaps, is taken up in the biosynthesis or indirectly participates in biosynthesis while the presence of the regulator acts to minimize loss of the extra sapogenin-affording material.

The present process is particularly applicable to the extraction of sapogenins such as diosgenin from species of *Dioscorea*, *Trigonella* and *Balanites*, and the following examples are given to illustrate the process. The proportion of regulator indicated is expressed with respect to the weight of the vegetable material in the condition in which it is used in the experiment. Sapogenin assay results are expressed with respect to the weight of the vegetable material on a moisture free basis (m.f.b.). This is an air-dried weight and the material contains less than 10 percent water weight for weight.

EXAMPLE 1

Treatment of *Dioscorea deltoidea* with indole 3-acetic acid (IAA) as regulator.

G. 1. Procedure A: Acid Hydrolysis only

One hundred g. dried powdered tuber (all particles pass B.S.S. No. 8) of *Dioscorea deltoidea* of moisture content 5.5 percent is boiled under reflux with 730 ml. 2N hydrochloric acid in a 2-liter conical flask for 2 hours. Afterwards, the mixture is cooled to room temperature and the acid-insoluble matter collected and washed with water and then 5 percent ammonia solution until it is alkaline. The insoluble residue is dried at 60° C. for 16 hours and then powdered in a Glen Creston Hand-Mill so that all the particles pass through a B.S.S. No. 10. This powder is extracted in a soxhlet apparatus with light-petroleum (b.p. 40°–60° C.), 1,200 ml. for 48 hours to exhaustion. The petroleum extract is set aside for 16 hours at room temperature and the crystalline diosgenin then collected at the pump and washed with light-petroleum to give a first crop of white crystals. The mother-liquor and washings are bulked and concentrated to a volume of 200 ml. and set aside as before to afford a second crop of off-white crystals.

G.2. Procedure B/b: Acid hydrolysis with regulator 2.5 ml. of a solution of indole 3-acetic acid (48 mg. in 10 ml. absolute alcohol) is pipetted into a 2-liter conical flask and left to evaporate overnight. To the flask is added 100 g. powdered tuber and 730 ml. 2N hydrochloric acid. Treatment is then continued as in G.1. above, and at the same time.

G. 3. Procedure C: Incubation without regulator

To a 2-liter flask is added 100 g. of the same batch of powdered tuber as used before. Tap water, 600 ml. is added and the flask swirled for 2 minutes. It is then set aside in an incubator in the dark at 37° C. for a total of 48 hours although the flask is swirled for 2 minutes after the initial 2-hour incubation and again after a further 22 hours. One-hundred and thirty ml. concentrated hydrochloric acid is then added and the mixture refluxed and worked up as in G.1. above.

G. 4. Procedure C: Incubation with regulator

IAA is added to a 2-liter flask as in G. 2. and the tuber powder added to the flask the next morning so that the incubation begins at the same time as in G. 3. above and the two experiments are then carried out together.

The procedures IAA concentrations and incubation times used in the gravimetric assay are shown in the table I below. The yields are based on the weight of sapogenin actually recovered as solid material.

TABLE I

| Experiment | Procedure | Regulator, p.p.m. | Incubation time, hrs. | Yield, g. 1st crop | Yield, g. 2d crop | M.P., °C. 1st crop | M.P., °C. 2d crop | Total, percent sapogenin m.f.b. |
|---|---|---|---|---|---|---|---|---|
| G1 | A | 0 | 0 | 3.11 | 0.82 | 210 | 206–7 | 4.16 |
| G2 | B/b | 20 | 0 | 3.43 | 0.63 | 209 | 207–8 | 4.30 |
| G3 | C | 0 | 48 | 4.21 | 0.54 | 210 | 205–6 | 5.02 |
| G4 | C | 20 | 48 | 4.00 | 1.04 | 210 | 206–7 | 5.33 |

Comparison of G2 with G1 and of G4 with G3 indicates the beneficial effect of the regulator.

The use of IAA as regulator is also investigated using a greater range of procedures, proportions of IAA and incubation times as follows:

Procedure C is modified as Procedure D/a in which the incubation is carried out without regulator, the regulator being added after the hydrochloric acid but before the acid hydrolysis, and as Procedure D/b in which the incubation is carried out without regulator, the regulator being added *before* the hydrochloric acid and acid hydrolysis. In experiments 1–16 2.5 g. portions of the dried powdered *D. deltoidea* tubers are added to a flask containing IAA when used (IAA is introduced as an ethanolic solution and the solvent then removed), 25 ml. tap water added, the mixture shaken for 5 minutes, a further 25 ml. tap water washed down the inside of the flask which is then set aside for incubation in the dark at 37° C. The product is then hydrolyzed and the acid insoluble material extracted as described in procedure A to give a crude diosgenin. This produce is assayed by a densiometric thin layer chromatographic procedure using a Chromoscan recording and integrating densitometer. The results obtained are shown in table II below.

TABLE II

| Exp. No. | Procedure | Regulator Concn. (p.p.m.) | Incubation time (hours) | Chromoscan Sapogenin Assay (% m.f.b.) |
|---|---|---|---|---|
| 1 | A | 0 | 0 | 4.20 |
| 2 | B/b | 200 | 0 | 4.31 |
| 3 | C | 0 | 24 | 4.68 |
| 4 | C | 0 | 48 | 4.65 |
| 5 | C | 0 | 72 | 4.68 |
| 6 | C | 2 | 24 | 4.98 |
| 7 | C 2 | | 48 | 5.18 |
| 8 | C | 2 | 72 | 5.24 |
| 9 | C | 20 | 24 | 5.18 |
| 10 | C | 20 | 48 | 5.41 |
| 11 | C | 20 | 72 | 5.21 |
| 12 | C | 200 | 24 | 5.31 |
| 13 | C | 200 | 48 | 5.40 |
| 14 | C | 200 | 72 | 5.24 |
| 15 | D/b | 200 | 48 | 5.55 |
| 16 | D/a | 200 | 48 | 5.43 |

Comparison of assays obtained in experiments using regulator with assays obtained in experiments without regulator but with an identical incubation period indicate the beneficial effect of the regulator.

EXAMPLE 2

Treatment of *Dioscorea deltoidea* with Giberellin (A+X)

The gravimetric and chromoscan assay procedures in example are repeated on the same scales using as regulator a Giberellin (A+X) product manufactured by Mann Research Laboratories Inc. The results obtained are indicated in Tables III and IV below.

TABLE III

| Experiment | Procedure | Regulator, p.p.m. | Incubation time, hrs. | Yield, g. 1st crop | Yield, g. 2d crop | M.P. °C. 1st crop | M.P. °C. 2d crop | Total sapogenin, percent m.f.b. |
| --- | --- | --- | --- | --- | --- | --- | --- | --- |
| G5 | A | 0 | 0 | 2.83 | 0.86 | 209 | 206–7 | 3.91 |
| G6 | B/b | 20 | 0 | 3.68 | 0.07 | 210 | 197–8 | 3.97 |
| G7 | A | 0 | 72 | 3.58 | 0.99 | 210 | 207–8 | 4.84 |
| G8 | C | 20 | 72 | 3.32 | 1.66 | 210 | 207–8 | 5.29 |

Comparison of G6 with G5 and of G8 with G7 indicates the beneficial effect of the regulator.

TABLE IV

| Exp. No. | Procedure | Additive Concn. (p.p.m.) | Incubation time (hours) | Sapogenin yield (% m.f.b.) |
| --- | --- | --- | --- | --- |
| 1 | A | 0 | 0 | 4.20 |
| 2 | B/b | 200 | 0 | 4.52 |
| 3 | C | 0 | 24 | 4.68 |
| 4 | C | 0 | 48 | 4.65 |
| 5 | C | 0 | 72 | 4.68 |
| 6 | C | 2 | 24 | 5.00 |
| 7 | C | 2 | 48 | 5.30 |
| 8 | C | 2 | 72 | 5.18 |
| 9 | C | 20 | 24 | 4.91 |
| 10 | C | 20 | 48 | 5.42 |
| 11 | C | 20 | 72 | 5.86 |
| 12 | C | 200 | 24 | 5.18 |
| 13 | C | 200 | 48 | 4.98 |
| 14 | C | 200 | 72 | 5.17 |
| 15 | D/b | 200 | 48 | 5.05 |
| 16 | D/a | 200 | 48 | 5.05 |

Comparison of assays obtained in experiments using regulator with assays obtained in experiments without regulator but with an otherwise procedure indicate the beneficial effect of the regulator.

EXAMPLE 3

Treatment of *Trigonella foenum-graecum* with indole 3-acetic acid (IAA)

Five g. uncomminuted seed of *T. foenum-graecum* (fenugreek) is added to 25 ml. tap water and the mixture incubated in the dark at 37° C. for 6 or 24 hours. Hydrochloric acid is then added to the incubated product to give finally a 2N solution which is refluxed for 2 hours. The refluxed mixture is cooled and filtered, the acid-insoluble residue washed with water and dilute ammonia until all traces of acid are removed, dried and extracted with petroleum ether to exhaustion in a Soxhlet. The organic solvent is finally evaporated to give a residue of crude diosgenin. Varying proportions of IAA are added to the mixture prior to it being set aside in the incubator and a control experiment is carried out in which the incubation is omitted and the seed subjected to immediate acid hydrolysis. The following results are obtained assaying the crude product in chloroform using an infrared spectrophotometer.

Table V

| | I.R. Assay Sapogenin %, m.f.b. | | |
| --- | --- | --- | --- |
| Incubation time, hrs. | Nil | 6 | 24 |
| Fenugreek alone | 1.13 | 1.06 | 1.01 |
| Fenugreek+1 p.p.m. IAA | | 1.33 | 1.37 |
| Fenugreek+10 p.p.m. IAA | | 1.26 | 1.34 |
| Fenugreek+100 p.p.m. IAA | | 1.29 | 1.34 |
| Fenugreek+800 p.p.m. IAA | 1.11 | 1.14 | 1.06 |

EXAMPLE 4

Treatment of *Trigonella foenum-graecum* with Gibberellins

The procedures described in example 3 are repeated using Gibberellin (A+X) and a 10 percent solution of Gibberellic acid potassium salt (obtained from Mann Research Laboratories Inc.) in place of IAA. The following results are obtained.

Table VI

| Gibberellin (A+X) | I.R. Assay Sapogenin %, m.f.b. | | |
| --- | --- | --- | --- |
| Incubation time, hrs: | Nil | 6 | 24 |
| Fenugreek alone | 1.13 | 1.06 | 1.01 |
| Fenugreek+1 p.p.m. regulator | | 1.28 | 1.33 |
| Fenugreek+10 p.p.m. regulator | | 1.09 | 1.29 |
| Fenugreek+100 p.p.m. regulator | | 1.14 | 1.29 |

Table VII

| Gibberellic Acid K salt (10%) | I.R. Assay Sapogenin %, m.f.b. | | |
| --- | --- | --- | --- |
| Incubation time, hrs: | Nil | 6 | 24 |
| Fenugreek alone | 1.13 | 1.06 | 1.01 |
| Fenugreek+1 p.p.m. regulator | | 1.28 | 1.29 |
| Fenugreek+10 p.p.m. regulator | | 1.10 | 1.19 |
| Fenugreek+100 p.p.m. regulator | | 1.19 | 1.34 |

EXAMPLE 5

General procedure C as described in example 1 is used to treat *Dioscorea deltoidea*, *Trigonella foenum-graecum* or *Balanites aegyptica* with various regulators for various incubation periods at 37° C. Results are shown in the tables below under columns D, F and B respectively. After incubation, the material is subjected to acid hydrolysis as described in procedure A of example 1. Unless indicated otherwise below, the sapogenin content in the hydrolysate is then assayed by infrared spectroscopic techniques. Asterisked results * are obtained from the Chromoscan assay as described in example 1. The assay is calculated as previously as a percentage based on the air-dried weight of the starting vegetable material and the figure under "% increase" in the table below is the % increase of assay obtained in this way with a similar assay calculated on an experiment run at the same time without regulator but otherwise under strictly comparable conditions.

Experiments with *Dioscorea* are carried out on tuber which has been air dried and powdered. Except where indicated below, experiments with *Trigonella* are carried out on whole seeds. Where powdered seed is indicated below thus+, this has been partially defatted. Except where indicated below, experiments with *Balanites* are carried out on powdered seeds which have been partially defatted, (residual oil content 3–20 percent w/w of the defatted seed).

Examples 1 to 4 illustrate the use of the naturally occurring plant growth regulators of group (a) described earlier as regulator.

The use of substances from groups (b) to (i) described earlier as regulator is illustrated in the following tables.

| Regulator | Concentration p.p.m. | Incubation Time Hours | % Increase D. F. B. |
|---|---|---|---|
| Pharmamedia | 10⁵ | 6 | 28 |
| Proflo | 10⁵ | 48 | 5 |
| Yeatex granules | 10⁵ | 6 | 39 |
| Yeatex super | 10⁵ | 48 | 8 |
| Lipostabil | 5×10⁴ | 24 | 48 |
| Vosolastine | 2×10⁵ | 24 | 42 |

Pharmamedia is a cottonseed embryo preparation, the main component is nonhydrolyzed globular protein.

Yeatex is a spray-dried aqueous extract of yeast. Lipostabil is a mixture of selected fractions of soya bean phosphatides and pyridoxine hydrochloride in a weight ration 400:3. Vasolastine is obtained from ampuls containing a mixture of enzymes of lipid metabolism, 8,000 units; tyrosine, 4,000 units; and aminoxidase, 4,000 units, in stabilizing solvent to 2 ml.

| Regulator: | Concentration p.p.m. | Incubation Time hours | % Increase D. F. B. |
|---|---|---|---|
| ethyl-α-(4-chloro-phenoxy)-α-methyl-propionate | 10⁸ | 48 | 6 |
| ethyl-α-(4-chloro-phenoxy)-α-methyl-propionate | 5×10⁴ | 24 | 34 |
| ethyl-α-(4-chloro-phenoxy)-α-methyl-propionate | 5×10⁴ | 24 | 8 |
| Alloxan monohydrate | 400 | 24 | 6+ |
| Alloxan monohydrate | 400 | 24 | 8 |
| N-6-benzyl adenine | 400 | 48 | 6 |
| 2,4-dichlorophenoxy acetic acid | 400 | 24 | 10 |
| 2,4,5-trichlorophenoxy acetic acid | 400 | 24 | 9 |
| 2,4,5-trichlorophenoxy propionic acid | 10.8 | 12 | 15 |
| 3-indole-butyric acid | 400 | 6 | 8 |
| iodo acetic acid | 400 | 72 | 16 |
| iodo acetic acid | 400 | 24 | 8 |
| iodoacetamide | 400 | 48 | 10 |
| iodosobenzoic acid | 400 | 6 | 13+ |
| α-naphthalene acetic acid | 400 | 72 | 5 |
| α-naphthalene acetic acid | 400 | 6 | 9+ |
| α-naphthalene acetic acid | 400 | 24 | 6 |
| N-ethyl maleimide | 400 | 72 | 5 |
| Maleic acid hydrazide | 400 | 24 | 6 |
| Maleic acid hydrazide | 400 | 6 | 7+ |
| β-(2-furyl) acrylic acid | 400 | 24 | 6  7 |
| β-(2-furyl) acrylic acid | 400 | 6 | 8+ |
| 1,1'-dimethyl-4,4'-dipyridylium Weedol (ICI) granules | 1.6×10³ | 24 | 8 |
| Nicotinic acid amide | 400 | 24 | 12 |
| Pyridoxine hydrochloride | 400 | 24 | 5 |
| Riboflavin | 400 | 6 | 13 |
| Thiamine hydrochloride | 400 | 24 | 11 |
| D-Calcium pantothenate | 400 | 24 | 6 |
| Choline chloride | 400 | 24 | 8 |
| Acetylcholine chloride | 400 | 24 | 15 |
| Folic acid | 400 | 24 | 7 |
| Meso inositol | 400 | 24 | 15 |
| Nicotinic acid | 400 | 24 | 7 |
| Pyridoxal hydrochloride | 400 | 24 | 15 |
| P-amino benzoic acid | 400 | 24 | 11 |
| DL-α-tocopherol acetate | 6×10³ | 6 | 14 |
| Rutin (rutoside) | 400 | 6 | 12 |
| Vitamin A, Acetate | 400 | 6 | 8 |
| DL-ethionine | 400 | 24 | 13 |
| DL-3-thienyl DL-Alanine | 400 | 24 | 6 |
| Glycine | 400 | 6 | 14 |
| Allyl-DL-glycine | 400 | 6 | 19 |
| DL-β-phenyl-lactic acid | 400 | 6 | 9 |
| α-picolinic acid hydrochloride | 400 | 24 | 14 |
| 2-chloro-4-aminobenzoic acid | 400 | 24 | 8 |
| Oxythiamine hydrochloride | 400 | 24 | 15 |
| DL-desthiobiotin | 400 | 24 | 14 |
| Desoxypyridoxine hydrochloride | 400 | 6 | 11 |
| Chloramphenicol | 2×10⁴ | 24 | 13 |
| Propranol hydrochloride | 2×10³ | 24 | 17 |
| Herbisan-5 [(diethyl dithio bis(thionoformate), 58%] | 4×10³ | 24 | 6 |
| 5-bromo-6-methyl-3-(1-methylpropyl)uracil | 400 | 24 | 6 |
| Griseofulvin | 5×10⁴ | 48 | 5 |
| Penicillin G, sodium salt | 5×10⁴ units per g. of air dried tuber. | 48 | 5 |
| Orotic acid (uracil 4-carboxylic acid) | 400 | 48 | 14 |
| 3-amino-1,2,4-triazole | 400 | 48 | 9 |
| DL-isoleucine | 4×10³ | 48 | 7 |

EXAMPLE 6

The experimental procedure and calculations described in example 5 are repeated using, in place of the single regulator, mixtures either of two regulators or of one or more regulators together with a recognized steroid precursor or a long chain saturated hydrocarbon which appears to act as a steroid precursor in the system. The percentage increases are with respect to a comparable incubation experiment in which additives are omitted.

| | Additives | Concentration, p.p.m. | Incubation time, hours | Percent increase D. F. B. |
|---|---|---|---|---|
| (a) | DL-mevalonic acid lactone. | 2.5×10⁴ | 6 | 5 |
| | 2,4,5-trichlorophenoxy propionic acid. | 1.08 | 6 | 9 |
| | DL-mevalonic acid lactone together with 2,4,5-trichlorophenoxy propionic acid both added at beginning of incubation. | 2.5×10⁴ } 1.08 } | 6 | 12 |
| (b) | 2,6,10,15,19,23-hexamethyl-tetracosa-2,6,10,14,18,22-hexaene (squalene). | 1.5×10⁵ | 12 | −*3 |
| | Gibberellic acid (90%+) | 138 | 12 | *2 |
| | Squalene together with gibberellic acid (90%+) both added at beginning of incubation. | 1.5×10⁵ } 138 } | 12 | *10 |
| (c) | n-Hexadecane together with 3-indole-acetic acid both added at beginning of incubation. | 2×10⁵ } 50 } | 24 | 5 |
| | n-Hexadecane added at beginning of incubation together with 3-indole-acetic acid added after 24 hours incubation. | 2×10⁵ } 50 } | 72 | 10 |
| | 3-indole-acetic acid added at beginning of incubation together with n-hexadecane added after 24 hours incubation. | 50 } 2×10⁵ } | 72 | 5 |
| (d) | n-Hexadecane together with gibberellin (A+X) both added at beginning of incubation. | 2×10⁵ } 480 } | 24 | 36 |
| (e) | n-Hexadecane together with gibberellin (A+X) and 3-indole-acetic acid all added at beginning of incubation. | 2×10⁵ } 480 } 50 } | 24 | 26 |
| | n-Hexadecane added at beginning of incubation, together with gibberellin (A+X) and 3-indole-acetic acid, both added after 24 hours incubation. | 2×10⁵ } 480 } 50 } | 72 | 5 |

I claim:

1. In a process for recovering steroidal saponins or sapogenins from saponin-containing vegetable materials the step of treating the vegetable material prior to recovery of the saponin or hydrolysis of the saponin to sapogenin, with a regulator of normal plant metabolism or normal plant growth said regulator being selected from the group consisting of
a. naturally occurring plant growth regulators
b. synthetic plant growth regulators
c. sulfhydryl inhibitors
d. regulators of lipid metabolism
e. regulators of steroid metabolism
f. naturally occurring and racemic α-amino acids
g. vitamins of the B group, rutin and water soluble derivatives of vitamin A and tocopherol
h. growth factor analogues including vitamin antimetabolites and amino acid antimetabolites and
i. antibiotics of the penicillin, griseofulvin and chloramphenicol classes.

2. A process according to claim 1 in which the regulator is indole-3-acetic acid or a gibberellin.

3. A process according to claim 1 in which the regulator is a chlorinated phenoxy alkanoic acid or a salt, ester or amide thereof; indole3-butyric acid; α-naphthalene acetic acid or a salt, ester or amide thereof; 1,1'-dimethyl-4,4'-dipyridylium dibromide; β-(2-furyl) acrylic acid; or 3-amino-1,2,4-triazole.

4. A process according to claim 1 in which the regulator is a mixture of enzymes of lipid metabolism.

5. A process according to claim 1 in which the regulator is ethyl α-(4-chlorophenoxy)-α-methyl propionate, or a soya bean phosphatide preparation.

6. A process according to claim 1 in which the regulator is N-ethyl maleimide, or iodoacetic acid, iodosobenzoic acid or iodoacetamide.

7. A process according to claim 1 in which the regulator is DL-isoleucine or a yeast preparation containing α-amino acids.

8. A process according to claim 1 in which the regulator is nicotinic acid, nicotinamide, riboflavin, thiamine hydrochloride, D-calcium pantothenate, choline chloride, acetylcholine chloride, folic acid, inositol (meso) pyridoxal hydrochloride, p-amino benzoic acid or is derived from an extract of yeast, cottonseed grain or soya bean which is rich in the B group vitamins or is vitamin A acetate, DL-α-tocopherol acetate or rutin.

9. A process according to claim 1 in which the regulator is glycine, allyl-glycine, α-picolonic acid hydrochloride, oxythiamine hydrochloride, DL-desthiobiotin or desoxypyridoxine hydrochloride.

10. A process according to claim 1 in which the regulator is chloramphenicol, griseofulvin or penicillin G.

11. A process according to claim 1 in which the regulator is alloxan monohydrate, N-6-benzyl adenine, 2,4-dichlorophenoxy acetic acid, 2,4,5-trichlorophenoxy acetic acid, 3-indole-butyric acid, maleic acid hydrazide, nicotinic acid amide, pyridoxine hydrochloride, DL-thienyl-DL-alanine, nicotinic acid, DL-ethionine, DL-β-phenyl-lactic acid, 2-chloro-4-aminobenzoic acid, propranol hydrochloride, diethyl dithio bis (thionoformate), 5-bromo-6-methyl-3-(1-methylpropyl)uracil, uracil 4-carboxylic acid or DL-isoleucine.

12. A process according to claim 1 in which the regulator is present in an amount of the order of 1,000 parts per million by weight based on the air-dry weight of the vegetable material.

13. A process according to claim 12, in which about 50 to 100 parts per million of regulator are used.

14. A process according to claim 1 in which the recovery procedure includes either the steps of extracting the vegetable material with a saponin solvent and then subjecting the saponin extract to hydrolysis conditions to cleave the glycosidic linkage or the steps of subjecting the vegetable material to hydrolysis conditions to cleave the glycosidic linkage and then extracting the hydrolysate with a sapogenin solvent.

15. A process according to claim 14, in which the vegetable material is treated with regulator prior to the hydrolysis step.

16. A process according to claim 1 including the step of incubating the vegetable material in the presence of an aqueous medium, at a temperature, and for a period of time such that the recoverable yield of saponin or sapogenin is increased compared to an otherwise identical recovery procedure from which incubation is omitted.

17. A process according to claim 17 in which, if necessary, sufficient water is added to the incubating mass to provide a separate aqueous phase throughout the incubation period.

18. A process according to claim 16 in which the regulator is added to the vegetable material at the beginning of or during the incubation period.

19. A process according to claim 1 in which the vegetable material is both treated with a regulator and brought into contact with a steroid precursor prior to recovery of the saponin or sapogenin.

20. A process according to claim 19 in which the steroid precursor is mevalonic acid or a derivative thereof or squalene.

21. A process according to claim 1 in which the vegetable material is brought into contact, prior to recovery of the saponin or sapogenin, with a saturated hydrocarbon containing 10 to 36 carbon atoms.

22. A process according to claim 21, in which the hydrocarbon is squalene, n-hexadecane, n-eicosane, n-pentacosane, n-hexacosane or n-octacosane.

23. A process according to claim 1 in which the saponin or sapogenin is recovered from a *Dioscorea* tuber, a *Solanum* or *Balanites* fruit or a *Balanites* or *Trigonella* seed.

* * * * *